(12) United States Patent
Way

(10) Patent No.: US 7,039,230 B2
(45) Date of Patent: May 2, 2006

(54) METHOD FOR COMPRESSING AN IMAGE BY USING CHARACTERISTIC VALUES

(75) Inventor: Jing-Dar Way, Tainan (TW)

(73) Assignee: Aiptek International Inc., Hsin-Chu (TW)

( * ) Notice: Subject to any disclaimer, the term of this patent is extended or adjusted under 35 U.S.C. 154(b) by 800 days.

(21) Appl. No.: 10/135,571

(22) Filed: May 1, 2002

(65) Prior Publication Data

US 2003/0206657 A1   Nov. 6, 2003

(51) Int. Cl.
*G06K 9/00* (2006.01)
(52) U.S. Cl. .................... 382/166; 382/232; 382/242; 382/250
(58) Field of Classification Search ............... 382/232, 382/166, 250, 242, 305, 282; 399/111, 118; 347/118, 138; 348/699; 375/240.16, 240.17; 707/3, 6
See application file for complete search history.

(56) References Cited

U.S. PATENT DOCUMENTS

| | | | |
|---|---|---|---|
| 5,663,787 A * | 9/1997 | Haneda et al. ............... 399/111 |
| 6,442,203 B1 * | 8/2002 | Demos ................... 375/240.16 |
| 6,728,412 B1 * | 4/2004 | Vasylyev ..................... 382/242 |
| 6,813,395 B1 * | 11/2004 | Kinjo .......................... 382/305 |

FOREIGN PATENT DOCUMENTS

| JP | 06251143 | * | 9/1994 |
|---|---|---|---|
| JP | 09093612 A | * | 4/1997 |

* cited by examiner

*Primary Examiner*—Anh Hong Do
(74) *Attorney, Agent, or Firm*—Rosenberg, Klein & Lee

(57) ABSTRACT

The present invention relates to a method compressing image data, more particularly to a method for compressing image data by using characteristic values. At first, input image data are executed by using a pre-processing process of the present invention. The pre-processing process is to use a mathematical calculation method, a filter, or a database to differentiate outlines of objects and to classify different objects of the image data. Then different colors, which are in the outlines of the different objects, are acquired by using a color classifying method and the different colors are used to be different characteristic values of the image data. At last, the different characteristic values are saved individually in a memory to finish the method for compressing image data by classifying colors.

13 Claims, 2 Drawing Sheets

|   |   | 1 | 2 | 3 | 4 | 5 | 6 |
|---|---|---|---|---|---|---|---|
|   | R | 1 | 2 | 3 | 4 | 5 | 6 |
| 2n-1 Line | G | 1 | 2 | 3 | 4 | 5 | 6 |
|   | B | 1 | 2 | 3 | 4 | 5 | 6 |

|   | R | 1 | 2 | 3 | 4 | 5 | 6 |
|---|---|---|---|---|---|---|---|
| 2n Line | G | 1 | 2 | 3 | 4 | 5 | 6 |
|   | B | 1 | 2 | 3 | 4 | 5 | 6 |

FIG.1A(PRIOR ART)

| R(2n-1,k)   | R(2n-1,k+1) | R(2n-1,k+2) |
|-------------|-------------|-------------|
| G(2n-1,k)   | G(2n-1,k+1) | G(2n-1,k+2) |
| B(2n-1,k)   | B(2n-1,k+1) | B(2n-1,k+2) |
| R(2n,k)     | R(2n,k+1)   | R(2n,k+2)   |
| G(2n,k)     | G(2n,k+1)   | G(2n,k+2)   |
| B(2n,k)     | B(2n,k+1)   | B(2n,k+2)   |
| R(2n+1,k)   | R(2n+1,k+1) | R(2n+1,k+2) |
| G(2n+1,k)   | G(2n+1,k+1) | G(2n+1,k+2) |
| B(2n+1,k)   | B(2n+1,k+1) | B(2n+1,k+2) |

FIG.1B(PRIOR ART)

METHOD FOR COMPRESSING AN IMAGE BY USING CHARACTERISTIC VALUES

BACKGROUND OF THE INVENTION

1. Field of the Invention

The present invention relates to a method compressing image data, more particularly to a method for compressing image data by using characteristic values to decrease amounts of data and increase amounts of the image data saving in the memory.

2. Description of the Prior Art

For present information users, especially to the personal computer users, a mode of the computer information has been changed from an unexciting word mode to a multi-media mode. The multi-media mode means that the information comprises words, images, and sounds. In order to show the multi-media mode in the face of viewers, various multi-media devices, which can collect the images and sounds, are developed. Because the multi-media information comprises more matters, memories, which are used to deal with the multi-media information, are greater than memories, which are used to deal with the unexciting word information to show the multi-media information more smoothly.

For an input image device, scanners and digital cameras are the common devices at the present day. The digital camera uses digital information to save the image, which is got from shooting a scene on a location. It uses a floppy disk card or a personal computer memory card international association (PCMCIA) card to save a static image. In order to decrease the memory of saving multi-media information, the images, which are got from shooting a scene on a location by using a digital camera, are saved by using compression files. The file format of a joint photographic experts group (JPEG) mode is common used in the static image compression files.

A photo, which is taken by using a digital camera, can be transmitted to the computer to proceed with an image process by using a RS-232 communication port or a printer port. The photo also can be printed by using a printer and cannot be showed by using the traditional developing and printing method. Getting the photo further has no problems in fixing a negative. Therefore, the digital camera is very suitable for reporters, who usually compete with time, because the digital camera can transmit the photo to become a file directly and then the file can be transmitted to newspaper office by using an electronic mail. At present, a dpi of the digital camera has several differences to a dpi of a traditional camera, which uses a negative. Especially when a light source of a place is not enough, the dpi of the digital camera is not being quite as good as the traditional camera. But there is a liquid crystal display (LCD) usually fixed in the digital, the photo image data can be previewed and deleted by using the LCD. This is a characteristic of the digital camera and is different from the traditional camera.

The other name of the digital is "digital still camera; DSC" to be differentiated from a digital dynamic camera. At present, most digital cameras use a charge-coupled device (CCD) or a complementary metal-oxide semiconductor (CMOS) to get a photo image data.

Referring to FIGS. 1A and 1B, this shows a diagram in an image, which is got from the traditional technology and is before transmitted. FIG. 1A shows how to choose R (red), G (green), and B (blue) at a beginning area of a digital image data. In FIG. 1A, each block expresses one color datum of a pixel in the digital image area. The number, which is in the block, expresses the location of the pixel in the digital image area. In the specification of the present invention, the signal P(x, y) expresses the image information-pixel value, wherein the signal x expresses a serial number of lines and the signal y expresses a serial number of the pixel on a line. For example, the signal P(2n−1, 1) expresses a pixel value, which is the first pixel of the 2n−1 line, wherein the signal n is a natural number.

FIG. 1B shows conditions of R, G, and B, which corresponds to each pixel. In FIG. 1B, the signals R(x, y), G(x, y), and B(x, y) individually express the colored information of the pixel P(x, y). If each pixel of R, G, and B is expressed in 8 bits, the data amount of each pixel is 3*8=24 bits.

From FIG. 1A and FIG. 1B, when the traditional scanner transmits the image data to the personal computer, all of R, G, and B of each pixel are transmitted. The image data, which will be transmitted, will be saved in a buffer of the digital camera at first. When the buffer is full, the buffer will transmit the data, which are saved in it, to a memory card of the digital camera to be saved. In general, occupied memory space of pixels is very huge. Therefore, if all of the R, G, and B of each pixel are saved in the memory card without compression procedure, the memory card will be often full and this condition will cause troubles for the user. When the amount of image data is greater, the memory card full conditions are more and the using time of the memory card is shorter. The lifetime of the memory card is also decreased. The memory card, whose all space is saved data, of the digital camera can be replaced by a new memory card to increase saving image data of the digital camera following needs of the user. But this condition will increase the cost of the user more easily. Therefore, compressing image data suitably will increase the photo image data of the memory card of the digital camera.

SUMMARY OF THE INVENTION

In accordance with the background of the above-mentioned invention, the traditional saving method will decrease the amount of the image data of the memory card to cause the shorter using time of the image-collecting device because the amount of saving image data is greater. The present invention provides a method to decrease the amount of the photo image data by using characteristic values to pre-compress the photo image data.

The second objective of the present invention is to increase the amount of the photo image data saved in the memory card by using characteristic values to pre-compress the photo image data.

The third objective of the present invention is to decrease full conditions of the memory card by using characteristic values to pre-compress the photo image data.

The fourth objective of the present invention is to increase a rate for data transmitting by using characteristic values to pre-compress the photo image data.

The further objective of the present invention is to increase the lifetime of the memory card by using characteristic values to pre-compress the photo image data.

In according to the foregoing objectives, the present invention provides a method to decrease the amount of the photo image data by using characteristic values to pre-compress the photo image data. At first, input image data are executed by using a pre-processing process of the present invention. The pre-processing process is to use a mathematical calculation method, a filter, or a database to differentiate outlines of objects and to classify different objects of the image data. After the input image data pass through the pre-processing process, the input image data are simplified the image data which only comprise a plurality of objects whose outlines are different, wherein each different object whose outline is different has its color. Then different colors, which are in the outlines of the different objects, are acquired by using a color classifying method and the different colors are used to be different characteristic values of the image data, wherein the color classifying method is to use shading values or varieties of the colors to classify the different colors. At last, the different characteristic values are saved individually in a memory to finish the method for compressing image data by classifying colors. The characteristic values, which are saved individually in the memory, are used to stand for the input image data. Therefore, the present invention method can decrease a using memory size when the input image data are saved in the memory. The present invention can also increase the amount of the photo image data saving in the memory card and decrease full conditions of the memory card. The present invention can further increase the lifetime of the memory card.

BRIEF DESCRIPTION OF THE DRAWINGS

In the accompanying drawing forming a material part of this description, there is shown:

FIG. 1A shows a diagram in how to choose the R, G, and B at a beginning area of a digital image data;

FIG. 1B shows a diagram of R, G, and B, which corresponds to each pixel; and

DESCRIPTION OF THE PREFERRED EMBODIMENT

Figure 2:
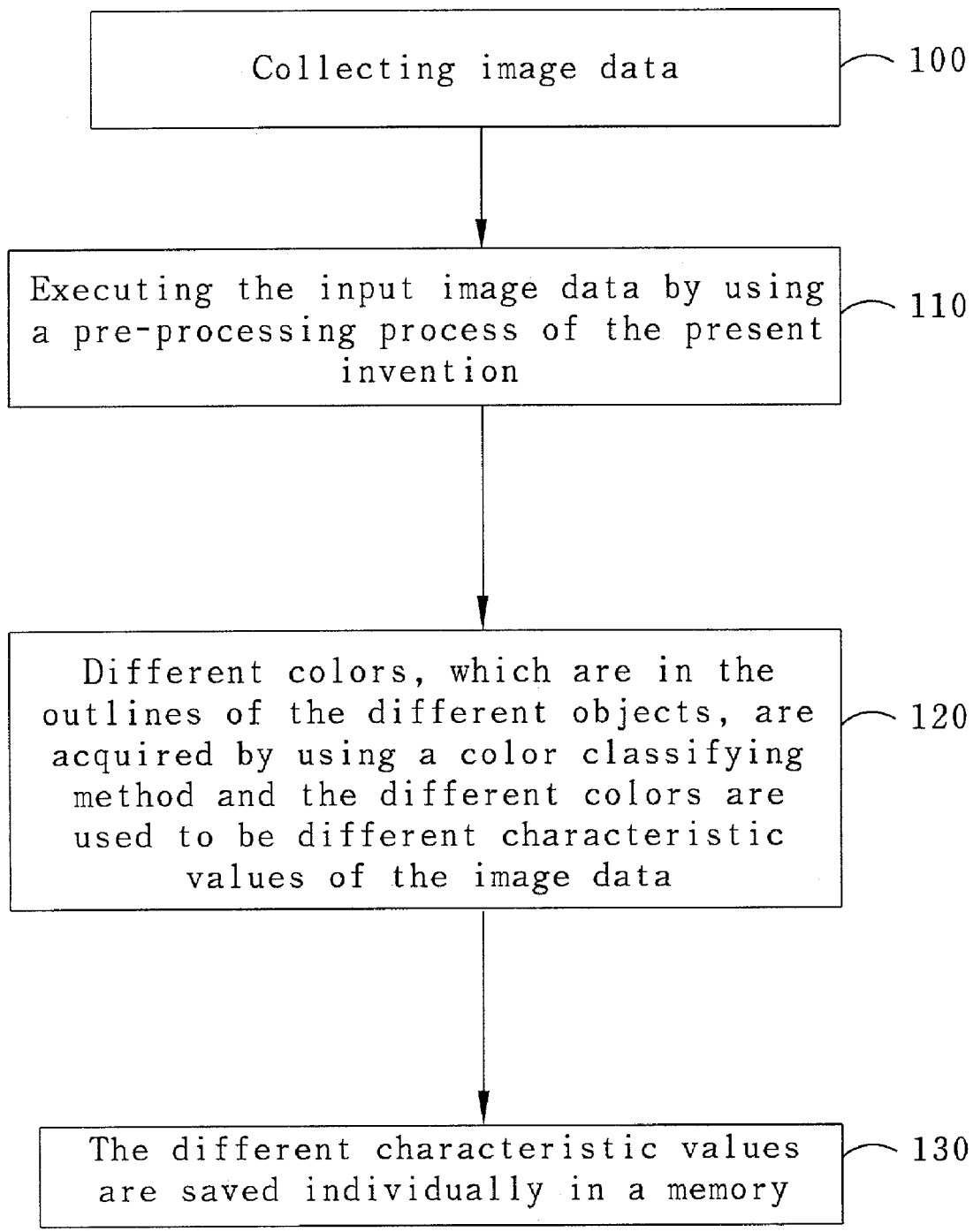
FIG. 2 shows a flowchart in compressing image data by using characteristic values of the present invention.

The foregoing aspects and many of the intended advantages of this invention will become more readily appreciated as the same becomes better understood by reference to the following detailed description, when taken in conjunction with the accompanying drawings, wherein:

The present invention provides a method to decrease the amount of the photo image data by using characteristic values to pre-compress the photo image data. At first, input image data, which are the first image data, are executed by using a pre-processing process of the present invention. The pre-processing process is to use a mathematical calculation method, a filter, or a database to differentiate outlines of objects and to classify different objects of the first image data. The filter is a device that separates data, signals or material in accordance with specified criteria. In the pre-processing of the present invention, the different objects, which are in the first image data, are classified by using different shape and different outline of each object. Therefore, the mathematical calculation method, the filter, or the database of the present invention is usually used to classify different objects by using different outlines and shapes of the different objects. After the first image data pass through the pre-processing process, the first image data are transformed to become the second image data which only comprise the different objects whose outlines are different, wherein each different object comprises its color.

Then different colors, which are in the outlines of the different objects, are acquired by using a color classifying method and the different colors are used to be different characteristic values of the image data, wherein the color classifying method is to use shading values or varieties of the colors to classify the different colors. At last, the different characteristic values are saved individually in a memory to finish the method for compressing image data by characteristic values, wherein the memory of the present is a flash memory. The characteristic values, which are saved individually in the memory, are used to stand for the first image data. Therefore, the present invention method can decrease a using memory size when the input image data are saved in the memory. The present invention can also increase the amount of the photo image data saving in the memory card and decrease full conditions of the memory card. The present invention can further increase the lifetime of the memory card.

Referring to FIG. 2, this shows a flowchart in compressing image data by using characteristic values of the present invention. At first of the present invention, image data are collected 100. Then the input image data are executed by using a pre-processing process of the present invention 110 to differentiate outlines of objects and to classify different objects of the image data. Then different colors, which are in the outlines of the different objects, are acquired by using a color classifying method and the different colors are used to be different characteristic values of the image data 120. At last, the different characteristic values are saved individually in a memory 130 to finish the method for compressing image data by classifying colors. The characteristic values, which are saved individually in the memory, are used to stand for the input image data.

Following description is one embodiment of the present invention method to compress the image data by using the characteristic values. The following embodiment will not limit a scope of the present invention.

When the input first image data comprise the first object and the second object, the input first image data are executed by using a pre-processing process of the present invention at first, wherein the first object comprises the first outline, which comprises the first color in it, and the second object comprises the second outline, which comprises the second color in it. The pre-processing process is to use a mathematical calculation method, a filter, or a database to differentiate outlines of the first object and the second object and to classify the first object and the second object of the first image data because the first outline is different from the second outline and the first color is different from the second color. After the first image data pass through the pre-processing process, the first image data are transformed to become the second image data, which only comprise the first outline, the second outline, the first color, and the second color.

Then the first color, which is in the first object, is acquired to be the first characteristic value and the second color, which is in the second object, is acquired to be the second characteristic value by using a color classifying method. At last, the first characteristic value and the second characteristic value are saved individually in a memory to finish the method for compressing image data by characteristic values, wherein the memory of the present is a flash memory. The first characteristic value and the second characteristic value, which are saved individually in the memory, are used to stand for the first image data.

Following description is another one embodiment of the present invention method to compress the image data by using the characteristic values. The following embodiment will not limit a scope of the present invention.

When the input first image data comprise a plurality of different objects, the input image data, which are the first image data, are executed by using a pre-processing process of the present invention, wherein each plurality of different objects comprises an outline and each outline comprises a color in it. The pre-processing process is to use a mathematical calculation method, a filter, or a database to differentiate outlines of objects and to classify different objects of the first image data because the outline of each plurality of different objects is different. After the first image data pass through the pre-processing process, the first image data are transformed to become the second image data which only comprise the plurality of the different objects whose outlines are different, wherein each different object comprises its color.

Then different colors, which are in the outlines of the plurality of the different objects, are acquired by using a color classifying method and the different colors are used to be a plurality of different characteristic values. At last, the plurality of the different characteristic values are saved individually in a memory to finish the method for compressing image data by characteristic values, wherein the memory of the present is a flash memory. The pluralities of the different characteristic values, which are saved individually in the memory, are used to stand for the first image data.

Following description is another one embodiment of the present invention method to compress the image data by using the characteristic values. The following embodiment will not limit a scope of the present invention.

When the input first image data comprise a face and a potted plant, the input first image data are executed by using a pre-processing process of the present invention at first. The pre-processing process is to use a mathematical calculation method, a filter, or a database to differentiate outlines of the face and the potted plant and to classify the face and the potted plant of the first image data because the outline of the face is different from the outline of the potted plant. In the pre-processing process, the face is separated narrowly in eyes, ears, a nose, eyebrows, and a mouse. The eyes comprise the first color and the first outline. The nose comprises the second color and the second outline. The mouse comprises the third color and the third outline. The ears comprise the fourth color and the fourth outline. The potted plant is also separated narrowly in a flowerpot and a plant in the pre-processing process. The flowerpot comprises the fifth color and the fifth outline and the plant comprises the sixth color and the sixth outline. After the first image data pass through the pre-processing process, the first image data are transformed to become the second image data, which only comprise the first outline, the second outline, the third outline, the fourth outline, the fifth outline, the sixth outline, the first color, the second color, the third color, the fourth color, the fifth color, and the sixth color. Then the first color, the second color, the third color, the fourth color, the fifth color, and the sixth color are acquired by using a color classifying method, wherein the first is used to be the first characteristic value, the second color is used to be the second characteristic value, the third color is used to be the third characteristic value, the fourth color is used to be the fourth characteristic value, the fifth color is used to be the fifth characteristic value, and the sixth color is used to be the sixth characteristic value. At last, the first characteristic value, the second characteristic value, the third characteristic value, the fourth characteristic value, the fifth characteristic value, and the sixth characteristic value are saved individually in a memory to finish the method for compressing image data by characteristic values, wherein the memory of the present is a flash memory. The first characteristic value, the second characteristic value, the third characteristic value, the fourth characteristic value, the fifth characteristic value, and the sixth characteristic value, which are saved individually in the memory, are used to stand for the first image data.

Following description is another one embodiment of the present invention method to compress the image data by using the characteristic values. The following embodiment will not limit a scope of the present invention.

When the input first image data comprise a plurality of different faces, the input image data, which are the first image data, are executed by using a pre-processing process of the present invention. The pre-processing process is to use a mathematical calculation method, a filter, or a database to differentiate outlines of faces and to classify different faces of the first image data because the outline of each plurality of different faces is different. In the pre-processing process, the face is separated narrowly in several objects like eyes, ears, a nose, eyebrows, and a mouse etc. because the outlines of facial features are different. After the first image data pass through the pre-processing process, the first image data are transformed to become the second image data which only comprise the plurality of the different faces whose outlines are different, wherein each different object comprises its color.

Then different colors, which are in the outlines of the plurality of the different faces, are acquired by using a color classifying method and the different colors are used to be a plurality of different characteristic values, wherein the color classifying method classify different colors by using different color shading value or different color types. In each face of the image data, the color shading value is used to be the characteristic value of the eyes and different colors are used to be the characteristic values of the ears, a nose, eyebrows, and a mouse. Each face is composed by using a group of characteristic values, wherein the group of characteristic values comprises the plurality of the characteristic values. At last, the pluralities of the different characteristic values are saved individually in a memory to finish the method for compressing image data by characteristic values, wherein the memory of the present is a flash memory. The pluralities of the different characteristic values, which are saved individually in the memory, are used to stand for the first image data.

In accordance with the present invention, the present invention provides a method to decrease the amount of the photo image data by using characteristic values to pre-compress the photo image data. At first, input image data are executed by using a pre-processing process of the present invention. The pre-processing process is to use a mathematical calculation method, a filter, or a database to differentiate outlines of objects and to classify different objects of the image data. After the input image data pass through the pre-processing process, the input image data are simplified the image data which only comprise a plurality of objects whose outlines are different, wherein each different object whose outline is different has its color. Then different colors, which are in the outlines of the different objects, are acquired by using a color classifying method and the different colors are used to be different characteristic values of the image data, wherein the color classifying method is to use shading values or varieties of the colors to classify the different colors. At last, the different characteristic values are saved individually in a memory to finish the method for compressing image data by classifying colors. The characteristic values, which are saved individually in the memory, are used to stand for the input image data. Therefore, the present invention method can decrease a using memory size when the input image data are saved in the memory. The present invention can also increase the amount of the photo image data saving in the memory card and decrease full conditions of the memory card. The present invention can further increase the lifetime of the memory card.

Although specific embodiments have been illustrated and described, it will be obvious to those skilled in the art that various modifications may be made without departing from what is intended to be limited solely by the appended claims.

What is claimed is:

1. A method for compressing an image, wherein said method comprises:

providing an image data, which comprise a first object and a second object, wherein said first object comprises a first outline and a first color and said second object comprises a second outline and a second color;

differentiating to extract said first outline, said second outline, said first color, and said second color out of said image data;

acquiring said first color that is correspondingly in the first outline as a first characteristic value and acquiring said second color that is correspondingly in the second outline as a second characteristic value, thereby pixel data of the image data is thus compressed into the first and the second characteristic value; and saving said first characteristic value and said second characteristic value in a memory.

2. The method according to claim 1, wherein said memory is a flash memory.

3. The method according to claim 1, wherein said first outline and said second outline are extracted by using a mathematical calculation method.

4. The method according to claim 1, wherein said first outline and said second outline are extracted by using a filter.

5. The method according to claim 1, wherein said first outline and said second outline are different with each other.

6. The method according to claim 1, wherein said first outline, said second outline, said third outline, and said fourth outline are extracted by using a mathematical calculation method.

7. The method according to claim 1, wherein said first outline, said second outline, said third outline, and said fourth outline are extracted by using a filter.

8. A method for compressing an image by using characteristic values, wherein said method comprises:

providing an image data, which comprise pluralities of different objects, wherein each object correspondingly comprises an outline and a color;

differentiating said plurality of different objects;

extracting said outline and said color out of said image data;

acquiring said color that is in the corresponding outline as a characteristic value, thereby pixel data of the image data is thus compressed into the characteristic values; and saving the characteristic values of said plurality of different objects in a memory.

9. The method according to claim 8, wherein said memory is a flash memory.

10. The method according to claim 8, wherein said outline is extracted by using a mathematical calculation method.

11. The method according to claim 8, wherein said outline is extracted by using a filter.

12. A method for compressing an image by using characteristic values, wherein said method comprises:

providing an image data, which comprises a face, wherein said face comprises eyes that comprise a first outline and a first color, a nose that comprises a second outline and a second color, a mouth that comprises a third outline and a third color, and ears that comprise a fourth outline and a fourth color;

differentiating to extract said first outline, said second outline, said third outline, said fourth outline, said first color, said second color, said third color, said fourth color from said image data;

acquiring said first color to be first characteristic value, acquiring said second color to be a second characteristic value, acquiring said third color to be a third characteristic value, and acquiring said fourth color to be a fourth characteristic value thereby pixels data of the image data is thus compressed into the first, the second, the third, and the fourth characteristic values; and saving said first characteristic value, said second characteristic value, said third characteristic value, and said fourth characteristic value in a memory.

13. The method according to claim 12, wherein said memory is a flash memory.

* * * * *